United States Patent [19]
Babirad et al.

[11] Patent Number: 5,239,026
[45] Date of Patent: Aug. 24, 1993

[54] LOW LOSS HIGH NUMERICAL APERTURE CLADDED OPTICAL FIBERS

[75] Inventors: Stefan A. Babirad, St. Paul, Minn.; Andrew S. Kuczma, Clinton, Conn.; Patricia M. Savu, Maplewood, Minn.

[73] Assignee: Minnesota Mining and Manufacturing Company, St. Paul, Minn.

[21] Appl. No.: 750,092

[22] Filed: Aug. 26, 1991

[51] Int. Cl.$^5$ ............................................ C08L 27/14
[52] U.S. Cl. .............................. 526/245; 252/182.18; 385/145
[58] Field of Search .................. 526/245; 252/182.18; 385/145

[56] References Cited

U.S. PATENT DOCUMENTS

| | | | |
|---|---|---|---|
| 2,743,297 | 4/1956 | Husted et al. | 260/561 |
| 3,997,604 | 12/1976 | Foulletier et al. | 260/561 N |
| 4,277,270 | 7/1981 | Krohn | 65/3 A |
| 4,317,616 | 3/1982 | Clarke | 350/96.34 |
| 4,505,543 | 3/1985 | Ueba et al. | 350/96.34 |
| 4,511,209 | 4/1985 | Skutnik | 350/96.34 |
| 4,544,235 | 10/1985 | Nishida et al. | 350/96.34 |
| 4,557,562 | 12/1985 | Ohmori et al. | 350/96.34 |
| 4,660,923 | 4/1987 | Ohmori | 350/96.34 |
| 4,687,295 | 8/1987 | Koishi et al. | 350/96.34 |
| 4,720,428 | 1/1988 | Ohmori et al. | 428/373 |
| 4,804,246 | 2/1989 | Kobayashi et al. | 350/96.34 |
| 4,836,642 | 6/1989 | Matsumoto et al. | 350/96.34 |
| 4,931,582 | 6/1990 | Heilmann et al. | 560/172 |
| 4,968,116 | 11/1990 | Hulme-Lowe et al. | 350/96.3 A |
| 4,971,424 | 11/1990 | Babirad et al. | 350/96.34 |
| 5,024,507 | 6/1991 | Minns et al. | 350/96.34 |

FOREIGN PATENT DOCUMENTS

| | | |
|---|---|---|
| 0128516 | 12/1984 | European Pat. Off. . |
| 0208239 | 7/1986 | European Pat. Off. . |
| 0239935 | 10/1987 | European Pat. Off. . |

OTHER PUBLICATIONS

E. P. Pleuddeman, "Silane Coupling Agents", Plenum Press, New York, 1982, p. 20.

L. L. Blyer, Jr., et al., "Polymers for High Technology", ACS Symp. Ser. 346, Chap. 34, pp. 410–416, 1987.

W. B. Beck et al., "Laser Focus/Electrooptics", pp. 90–96 (1984).

B. J. Skutnik, et al., Mat. Res Symp. Proc., 1987, 88, 27.

Krohn et al., ISA Proceedings, 1990 1633.

Skutnik et al., "Dual Clad (Coat) Pure Silica Optical Fibers for Biosensors/Endoscopes" SPIE vol. 1067 Optical Fibers in Medicine IV (1989) p. 22.

Aleksandrov et al., Soviet J. Quantum Electronics, 1980, 10, 105.

Assignee's copending application U.S. Ser. Nos. 07/728,184, 07/531,849.

Primary Examiner—Maurice J. Welsh
Attorney, Agent, or Firm—Gary L. Griswold; Walter N. Kirn; Lorraine R. Sherman

[57] ABSTRACT

The present invention provides a curable coating composition comprising at least one fluorinated monoacrylate monomer, at least one polyethylenically unsaturated fluorinated crosslinking monomer different from the acrylate monomer, and at least one adhesion promoting monomer different from any other monomer in the composition of matter, which preferably is a fluorinated acrylamide silane. Optionally, fluorinated acrylamide silane monomers, non-fluorinated mono- or polyethylenically unsaturated monomers, or non-fluorinated silane adhesion promoting monomers may be added.

The free radical polymerization product of the aforementioned coating composition provides a novel cladding material for optical fibers. The optical fibers of the invention can be used as waveguides in communications and laser delivery systems.

27 Claims, 1 Drawing Sheet

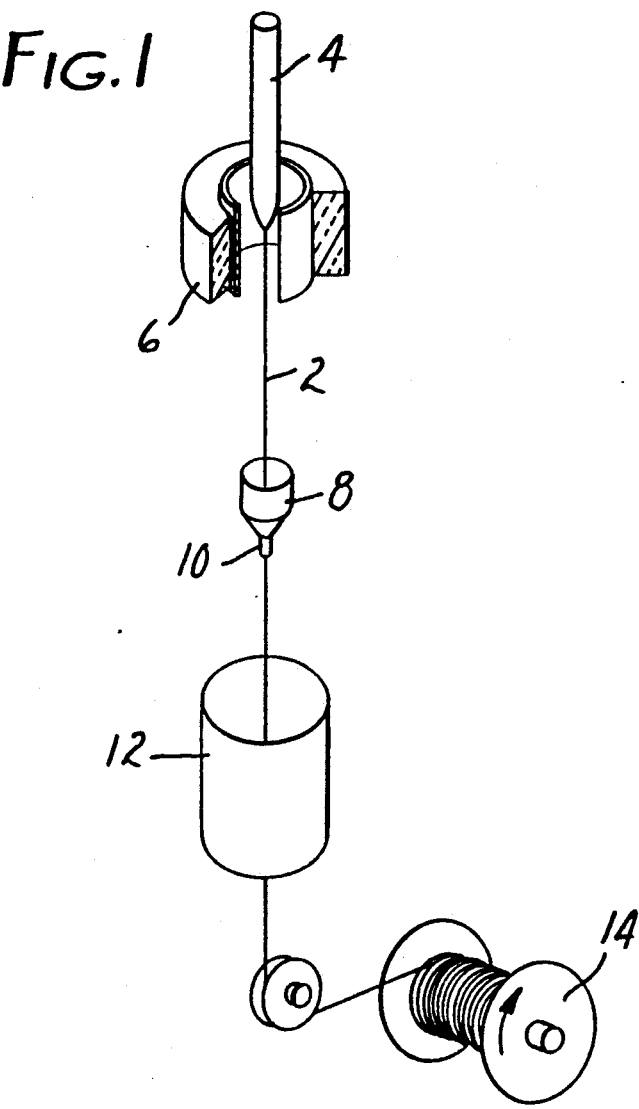

LOW LOSS HIGH NUMERICAL APERTURE CLADDED OPTICAL FIBERS

FIELD OF THE INVENTION

This invention relates to cladding compositions that are curable by actinic radiation. In yet another aspect, it relates to an article such as an optical fiber or waveguide comprising the cured cladding composition surrounding or covering a siliceous or polymeric core.

BACKGROUND OF THE INVENTION

Silane coupling agents having ambifunctionality are known in the art to provide a stable bond between two dissimilar substrates, usually organic to inorganic, such as organic polymers to inorganic substrates such as glass, mineral fillers, metals, and metallic oxides. The bond between the inorganic and the organic components generally result in greater strength and service life to the polymer.

Polymerizable silane coupling agents are commercially available from numerous sources. Despite their general availability, however, only nonfluorinated polymerizable silane coupling agents are known. The polymerizable group contains either (meth)acrylate, allyl, styryl, amino, or epoxy functionalities, while the silane group is usually an alkoxy silyl moiety (generally methoxy or ethoxy) which serves as a binding site to hydroxy-functional inorganic substrates via displacement of the alkoxy groups. Additional information concerning silane coupling agents may be found in the book by E. P. Pleuddeman ("Silane Coupling Agents", Plenum Press: New York, 1982, p 20).

Substitution of fluorine for hydrogen in polymers and coatings is often desirable to impart useful properties such as lower surface energy. Typically, incorporation of fluorine into polymers and coatings has been made by copolymerizing (meth)acrylate monomers derived from (meth)acrylic acid and highly fluorinated alcohols. However, (meth)acrylates often polymerize at slow rates and provide polymers which possess inadequate thermal and hydrolytic stabilities.

Fluorinated (meth)acrylamide monomers have been described in several patents. U.S. Pat. Nos. 2,743,297 and 3,997,604 disclose fluorinated (meth)acrylamide monomers prepared by the reaction of fluorinated secondary or primary amines and (meth)acryloyl chloride; a complication in the synthesis is the removal of by-product hydrogen chloride.

2-Alkenyl azlactones are known to react with certain nucleophiles such as primary amines and alcohols to afford (meth)acrylamide-functional products. It is disclosed in U.S. Pat. No. 4,931,582 that linear fluorinated-alcohols and -diols, when reacted with 2-alkenyl azlactones, yield desirable fluorinated, acrylamide-functional monomers.

Optical fibers and waveguides in their simplest construction consist of a so-called core material through which the majority of the optical information passes and, surrounding the core, a cladding material which transmits some of the light but whose principal function is to restrict the optical information to the core region of the construction.

Core materials have either been siliceous (glass) or organic polymer in nature. While certain advantages, such as outstanding flexural strength, ease of processing, and facile connectorization attend organic polymer cores, glass cores are virtually unchallenged in their ability to transmit optical information with a low degree of attenuation or loss. Therefore, considerable effort has been made in the art to utilize glass cores despite obvious drawbacks such as brittleness, moisture sensitivity, and extreme processing conditions.

Effective cladding materials exhibit low refractive indices and low moisture vapor transmission rates. Fluorinated polymer claddings have been described to meet these criteria on both organic polymer cores (for example, in U.S. Pat. Nos. 4,505,543; 4,544,235; 4,557,562; 4,660,923; 4,687,295; 4,720,428; and 4,836,642) and glass cores (for example, in Eur. Patent Appl. 128,516; Eur. Patent Appl. 239,935; U.S. Pat. No. 4,804,246). A problem with these fluorinated polymer systems, however, is that they are applied to the core material either from solution which can be polluting to the environment and require complete outgassing of even the last traces of solvent for optimum performance or are melt extruded onto the core which can be very physically damaging to the surface of the core.

An innovation in the fiber optics industry was put forth in U.S. Pat. No. 4,511,209 describing so-called "hard clad silica" (HCS) fibers that were cured by ultraviolet light. Earlier approaches to UV curable cladding-/buffer materials had stressed that the cladding or primary coating should be very elastomeric and possess a low modulus, while the buffer or secondary protective coating should be a tough, high modulus material. These precepts for so-called "plastic clad silica (PCS) fibers usually involved very low modulus silicone cladding materials and are described, for example, by L. L. Blyer, Jr., et. al., " Polymers for High Technology", ACS Symp. Ser. 346, edited by M. J. Bowden and S. R. Turner, published by the American Chemical Society: Washington, D.C., Chapter 34, pp 410–416, 1987. In contrast, HCS fibers (further described by W. B. Beck and M. H. Hodge, "Laser Focus/Electrooptics", pp 90–96 (1984) and by B. J. Skutnik, et. al., *Mat. Res. Symp. Proc.*, 1987, 88, 27) feature a hard polymer cladding that is chemically bonded to a glass core.

Earlier, we disclosed in U.S. Pat. No. 4,968,116 a fluorinated cladding system that comprised 40 to 95% by weight of a fluorinated acrylate, from 2 to 35% by weight of a polyfunctional crosslinking acrylate being difunctional or higher, and a photoinitiator. We further disclosed that the addition of a vinyl functionalized component such as (meth)acrylic silanes and (meth)acrylic acid enhances the adhesion to the core material. Krohn et. al., ISA Proceedings, 1990, 1633; describes that the above clad fiber provides: chemical resistance to most polar (water, acids) and non-polar (acetone, oils) solvents; increased stress corrosion resistance of the fiber, providing longer service life; and superior low temperature performance. In U.S. Pat. No. 4,971,424, we also disclose compositions which are viscous liquids at ambient temperatures of 20°–30° C. and are useful as cladding materials for optical fibers and waveguides.

The above-mentioned cladding compositions provide optical fibers which are useful for transmitting optical information and have numerical apertures (NA) generally in the range of 0.35–0.39.

Skutnik, B. J. et al., in "Dual Clad (Coat) Pure Silica Optical Fibers for Biosensors/Endoscopes" SPIE Vol. 1067 *Optical Fibers in Medicine IV* (1989) p 22 describes high NA optical fibers.

Materials have been utilized to achieve a high NA optical fiber. Aleksandrov et al. (*Soviet J. Quantum*

*Electronics,* 1980, 10, 105) have suggested the use of organic silicone compounds to yield high NA optical fibers. Organopolysiloxane claddings have been described to meet these criteria (for example, in Eur. Patent Appl. 208,239 and U.S. Pat. No. 4,317,616). A problem with these organopolysiloxane systems, however, is that they are applied to the core material from solution (vide supra). Low refractive index inorganic materials such as boron, fluorine, etc. have been used as claddings to obtain high NA optical fibers utilizing the so-called chemical vapor deposition (CVD) techniques. For example, in U.S. Pat. No. 4,277,270 use of barium, sodium, boron, and arsenic was disclosed to form a multicomponent glass core with a NA value of 0.49. Problems encountered with these glass-glass systems include very expensive and elaborate CVD equipment which is needed to dope the glass core with the inorganic substance.

Plastic optical fibers such as polymethyl methacrylate have high NA values. However, these fibers are limited in use since high temperature applications cannot be achieved and optical loss values are extremely high when utilizing long lengths for data transmission.

SUMMARY OF THE INVENTION

Briefly, the present invention provides a curable coating composition comprising at least one fluorinated monoacrylate monomer, at least one polyethylenically unsaturated fluorinated crosslinking monomer different from the acrylate monomer, and at least one adhesion promoting monomer different from any other monomer in the composition of matter which optionally can be a fluorinated acrylamide silane monomer. Optionally, a silane-free fluorinated acrylamide monomer, non-fluorinated mono- or polyethylenically unsaturated monomer, or non-fluorinated silane adhesion promoting monomer, may be added.

In yet another aspect, the present invention discloses a novel cladding material for optical fibers which is the free radical polymerization product of the aforementioned coating composition.

The optical fibers of the invention can be used as waveguides in communications systems or preferably as laser delivery systems.

Preferably, the curable coating compositions of the invention contain no inert solvents that must be removed from the resultant cladding. When exposed to actinic radiation, the compositions yield cladding materials which possess very low refractive indices and provide silica optical fibers with improved light accepting and transmitting abilities. The cladding materials of the invention strongly adhere to an information transmitting component (i.e., core, grating, or support) without undergoing extensive shrinkage and are amorphous and relatively optically transparent. They are toughened coatings capable of withstanding normal handling and subsequent processing operations.

In this application:

"acrylamide" and "acrylate" are used in a generic sense and mean not only derivatives of acrylic acid, but also methacrylic and other modified acrylic acids including both so-called acryloyl, i.e., 2-propenoyl, and methacryloyl, i.e., 2-methyl-2-propenoyl, amine and alcohol derivatives, respectively;

"alkyl" and "alkylene" mean the monovalent and divalent residues remaining after removal of one and two hydrogen atoms, respectively, from a linear or branched chain hydrocarbon having 1 to 20 carbon atoms;

"lower alkyl" means $C_1$ to $C_4$ alkyl;

"aryl" and "arylene" mean the monovalent and divalent residues remaining after removal of one and two hydrogen atoms, respectively, from an aromatic compound (single ring and multi- and fused-rings) having 5 to 12 ring atoms and includes substituted aromatics such as lower alkaryl and aralkyl, lower alkoxy, N,N-di(-lower alkyl)amino, nitro, cyano, halo, and lower alkyl carboxylic ester, wherein "lower" means $C_1$ to $C_4$;

"azlactone" means 2-oxazolin-5-one groups of Formula I and 2-oxazin-6-one of Formula II:

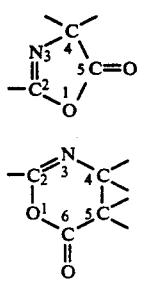

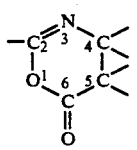

"cycloalkyl" and "cycloalkylene" mean the monovalent and divalent residues remaining after removal of one and two hydrogen atoms, respectively, from a cyclic hydrocarbon having 3 to 12 carbon atoms;

"substantially perfluorinated" means hydrocarbon groups in which at least 50 percent of the hydrogen atoms have been replaced by fluorine;

"core" means a fibril, a grating, a surface, or any other solid medium through which optical information can be transmitted;

"catenary" means in the backbone; and

"relatively optically transparent" means having an optical loss value of no more than 1000 decibels (dB) per kilometer (Km).

Cladding materials are essential components of an optical fiber or waveguide, and design of proper cladding materials can often compensate for disadvantages of the glass cores. The most important requirement for an effective cladding, which is provided by the present invention, is a refractive index which is lower than that of the core material. This requirement derives from Snell's Law and the consequence that as electromagnetic radiation passes from a medium of high refractive index into a medium of low refractive index, the path of the light is deviated, i.e., refracted, away from a 90° angle (the normal angle) between the two media. This then allows incident light at angles other than 0° to be transmitted along the fiber path by total internal reflection. The maximum angle of incident light that will be accepted by the core is called the critical angle. Generally, it is desirable to have as large a difference as possible between the refractive indices of the core and cladding, not only so that larger angles of incident light will be accepted but also because organic polymer claddings generally undergo greater volume contraction with decreasing temperatures than glass cores. Since refractive index is directly related to density changes, it is desirable to have a cladding with as low an index as possible so that the construction will function properly at very low operating temperatures. Cladding compositions of the invention have refractive indices in the range of 1.32 to 1.40, preferably in the range of 1.37 to 1.40, more preferably 1.37 to 1.38.

An additional important parameter of an optical system is numerical aperture (NA). This value indicates the ability of the fiber to collect light incident over a wide range of angles. The ability of a fiber to accept light at large acceptance angles has numerous advantages. For instance, the ease of connectorization and low susceptibility to microbend losses would be achieved with the use of a high NA optical fiber. Optical fibers containing cladding compositions of the present invention have NA values in the range of 0.40 to 0.50, preferably 0.46 to 0.50, for a 2 meter length of fiber, measured at 633 nm.

Cladding materials of the present invention have a low moisture vapor transmission rate, which is especially important for glass cores and supports. As was noted above, migration of water to the clad-core interface causes a significant loss in performance. Water either becomes physically adsorbed or actually engages in a chemical reaction with the siliceous core surface forming silanol groups. Both physically adsorbed moisture and generation of silanol groups (through chemical reaction) are very disadvantageous because they can adversely affect adhesion, tensile strength, and optical transmission of the core.

From a physical standpoint, the cladding material should be non-tacky and sufficiently tough so that physical integrity is maintained under normal handling and operating conditions. Even though the clad-core assembly is usually covered with an additional protective coating, called a "buffer", the buffer is not always applied immediately, i.e., in line with the cladding application. Therefore, a cladding material possessing considerable physical integrity is highly desirable. Also, as a consequence of applying the buffer coating, the cladding must be tolerant of buffer application conditions which are often thermal extrusion operations conducted at temperatures as high as 335° C.

Fluorinated adhesion promoting monomers are disclosed in assignee's copending patent application U.S. Ser. No. 749,926, filed Aug. 26, 1991 filed the same date as this application, which is incorporated herein by reference.

BRIEF DESCRIPTION OF THE DRAWING

The drawing shows an apparatus for coating an optical fiber.

DETAILED DESCRIPTION OF PREFERRED EMBODIMENTS

In a preferred embodiment, the present invention provides curable coating compositions comprising 100 parts by weight of ethylenically unsaturated monomers which comprise:

(1) from 10 to 99 parts, preferably 40 to 96 parts, of fluorinated acrylate monomers of Formula III

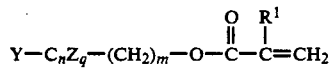

wherein:
Y can be H, F, Br, or Cl;
provided that Y or at least one Z is a fluorine atom;
Z can be H, F, Br, or Cl;
$R^1$ can be H or a lower alkyl group, preferably $CH_3$;
n can be an integer from 2 to 12;

q can be an integer from 4 to 24 such that $q=(2n-2)$ or $(2n)$;
m can be 0, 1, or 2; with the proviso that for Z not more than one atom of hydrogen or chlorine is present for every two carbon atoms in the group $C_nZ_q$.

Specific examples of such compounds include: 1,1-dihydroperfluorocyclohexane carbinol acrylate, 1,1-dihydroperfluorocyclohexane carbinol methacrylate, 1,1-dihydroperfluorocyclopentane carbinol acrylate, 1,1-dihydroperfluorocyclopentane carbinol methacrylate, 1,1-dihydroperfluorooctyl acrylate, 1,1-dihydroperfluorooctyl methacrylate, 1,1-dihydroperfluorobutyl acrylate, 1,1,2,2-tetrahydroperfluorooctyl acrylate, 1,1,2,2-tetrahydroperfluorooctyl methacrylate, 1,1,2,2-tetrahydroperfluorodecyl acrylate, 1,1,2,2-tetrahydroperfluorodecyl methacrylate, 1H,1H,5H-octafluoropentyl acrylate, 1H,1H,11H-eicosafluoroundecyl acrylate, hexafluoroisopropyl acrylate, and perfluoropentyl acrylate. An especially preferred fluorinated acrylate monomer is 1,1-dihydroperfluorocyclohexane carbinol acrylate.

The acrylates may also contain other atoms, i.e., heteroatoms such as oxygen, sulfur or nitrogen, in addition to fluorine. For example, fluorinated monoacrylates of Formula IV may be employed:

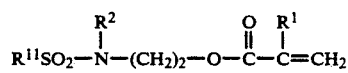

wherein:
$R^1$ can be defined as above;
$R^2$ can be hydrogen or a lower alkyl group;
$R^{11}$ can be a fluoro aliphatic radical having 3 to 12 carbon atoms, preferably $C_yF_{2y+1}$ in which y is an integer from 3 to 12.

Specific examples of such compounds include: 2-(N-ethyl perfluorooctane sulphamido)ethyl acrylate, 2-(N-ethyl perfluorooctane sulphamido)ethyl methacrylate, 2-(N-butyl perfluorooctane sulphamido)ethyl acrylate.

Combinations of two or more fluorinated mono-acrylates may also be employed.

(2) from 1 to 20 parts by weight, preferably 2 to 15 parts, of polyethylenically unsaturated fluorinated crosslinking monomers;

Crosslinking monomers provide insolubility to the resulting polymer as well as high thermal stability; Representative examples of such compounds include: 2,2-difluoro-1,3-propanediol diacrylate, 2,2,3,3-tetrafluoro-1,4-butanediol diacrylate, 2,2,3,3,4,4-hexafluoro-1,5-pentanediol diacrylate, 2,2,3,3,4,4,5,5-octafluoro-1,6-hexanediol diacrylate, 2,2,3,3,4,4,5,5,6,6-decafluoro-1,7-hepatanediol diacrylate, 2,2,3,3,4,4,5,5,6,6,7,7-dodecafluoro-1,8-octanediol diacrylate, 1H, 1H,7H,7H-tetrahydroperfluoro[2-methyl-3-oxa-heptane]-1,7-diol diacrylate, 1,3-(bis)acryloylmethyl perfluorocylohexane, and 1,4-(bis)acryloylmethyl perfluorocyclohexane. The preferred fluorinated crosslinker is 2,2,3,3,4,4-hexafluoro-1,5-pentanediol diaorylate as is described in U.S. Pat. No. 3,055,932.

Many of the preferred polyethylenically unsaturated fluorinated monomers have the formula

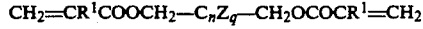

wherein $R^1$, n, Z, and q are as defined above.

The polyethylenically unsaturated crosslinking monomers may also be non-fluorinated. For example, polyfunctional acrylic acid esters such as 1,2-ethylenediacrylate, 1,6-hexanediol diacrylate, 1,4-butanediol diacrylate, trimethylolpropanetriacrylate, and pentaerythritol tetraacrylate may be employed. The preferred non-fluorinated crosslinker would be trimethylolpropanetriacrylate.

Mixtures of fluorinated and nonfluorinated crosslinking acrylates may be employed.

(3) from 0.5 to 10 parts by weight, preferably 2 to 5 parts, of adhesion promoting monomers, which preferably are fluorinated acrylamide silane adhesion promoting monomers of Formula V

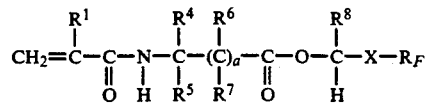

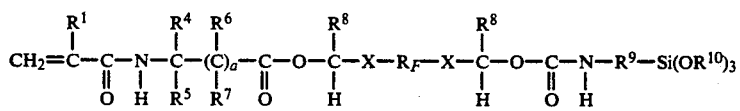

wherein:
$R^1$ and $R^8$ are independently hydrogen or methyl;
$R^4$ and $R^5$ independently can be an alkyl, preferably methyl, cycloalkyl, or aryl groups, or $R^4$ and $R^5$ taken together with the carbon to which they are joined can form a carbocyclic ring containing 4 to 12 ring atoms;
$R^6$ and $R^7$ are independently hydrogen or lower alkyl;
$R^9$ can be alkylene, cycloalkylene, or arylene;
$R^{10}$ can be hydrogen or lower alkyl, preferably ethyl or methyl;
a is 0 or 1;
X is a carbon-to-carbon single bond, $CH_2$, $CH_2OCH_2$, or $CH_2CH_2OCH_2$; and
$R_F$ is a substantially perfluorinated alkylene, cycloalkylene, or arylene group, optionally comprising up to 6 catenary non-peroxidic oxygen atoms. Compounds of Formula V and method of preparation as disclosed in assignee's copending patent application U.S. Ser. No. 749,926, which is incorporated herein by reference.

Preferred fluorinated acrylamide silanes are those of Formula V in which each $R^1$ and $R^8$ is hydrogen; each $R^4$ and $R^5$ is methyl; $R^9$ is propylene; $R^{10}$ is ethyl; X is $CH_2$; $R_F$ is $(CF_2)_3OCF(CF_3)$; and a is zero.

Alternatively to the preferred adhesion promoting monomers of Formula V, hydrocarbon adhesion promoting monomers may be employed. These are of two kinds: 1) those which promote adhesion between cladding and glass and, to a lesser extent, organic polymer cores by relatively weak attractive forces such as Van der Waals and dipole-dipole interactions; and 2) those which promote adhesion by strong covalent bonding between cladding and glass cores. Adhesion promoting monomers of the first kind include polar ethylenically unsaturated monomers such as acrylic acid, N,N-dimethylacrylamide, hydroxyethyl acrylate, and hydroxybutyl vinyl ether. Adhesion promoting monomers of the second kind which are preferred with glass cores include the trialkoxysilylalkyl acrylic monomers such as trimethoxysilylpropyl methacrylate. Mixtures of fluorinated and non-fluorinated adhesion promoting monomers may also be employed.

(4) from 0 to 88 parts by weight, preferably 0 to 50 parts, of silane-free fluorinated acrylamide monomers of Formula VI

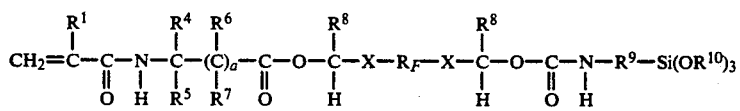

wherein:
$R^1$, $R^4$, $R^5$, $R^6$, $R^7$, $R^8$, a, X, and $R_F$ are as previously defined.

Specific examples of such compounds are described in U.S. Pat. Nos. 4,931,582 and 4,971,424, which are incorporated herein as reference. An especially preferred fluorinated acrylamide monomer is where $R^1$ and $R^8$ are
$R^1$, $R^4$, $R^5$, $R^6$, $R^7$, $R^8$, a, X, and $R_F$ are as previously hydrogen; $R^4$ and $R^5$ are methyl; X is $CH_2O$ $CH_2$; $R_F$ is $CF_3(CF_2)_6$; and a is zero. Mixtures of fluorinated mono-acrylates and fluorinated mono-acrylamides may also be employed.

(5) from 0 to 50 parts by weight, preferably 10 to 30 parts, of non-fluorinated monoethylenically unsaturated monomers;

Specific examples of such compounds include: styrene and monofunctional acrylate esters (up to twenty carbon atoms) such as butyl acrylate, ethyl acrylate, methyl acrylate, methyl methacrylate, 2-ethylhexyl acrylate, cyclohexylmethyl acrylate, and phenethyl acrylate. Preferred non-fluorinated monomers are ethyl acrylate and methyl methacrylate.

(6) from 0 to 10 parts by weight, preferably 2 to 5 parts, of non-fluorinated polyethylenically unsaturated crosslinking monomers;

Specific examples of such compounds include: polyfunctional acrylic acid esters such as 1,2-ethylene diacrylate, 1,6-hexanediol diacrylate, 1,4-butanediol diacrylate, trimethylolpropanetriacrylate, and pentaerythritol tetraacrylate, with trimethylolpropane triacrylate being preferred.

By reason of at least one of polyethylenically unsaturated fluorinated crosslinking monomers or the unsaturation of fluorinated acrylamide silane monomers, novel and useful curable coating compositions are obtained by incorporating therein other curable monomers.

The invention provides novel claddings for siliceous cores and transparent organic polymer cores and substrates which are useful for transmitting optical information. Representative polymer cores and supports include poly(methyl methacrylate), poly(styrene), and poly(carbonates). The cladding materials are the free radical polymerization products of the above described coating compositions selected to provide a refractive index lower than that of the core, preferably at least 0.03 units less, more preferably at least 0.05 units less than the refractive index of the core. Typically cores have diameters in the range of 100 to 1000 micrometers. Claddings can range in thickness from 5 to 100 micrometers.

Actinic radiation necessary for the polymerization of the monomeric cladding compositions to form the polymeric cladding compositions of the invention can be supplied in two forms: high energy electrons (emitted from commercial electron beam generators) and ultraviolet light. With ultraviolet light a photoinitiator is generally required for the light to be absorbed and for polymerization to be initiated. A photoinitator can be added to the system in a concentration range of from 0.1 to 5.0 percent, preferably 1.0 to 3.0 percent, by weight (based on polymerizable monomers). Useful photoinitators include acyloins and acyloin ethers which are commercially available.

The cladding compositions may also comprise a thermal stabilizer/antioxidant. Optical fibers must retain a high level of signal transmitting capability over a relatively wide operating temperature range and must pass a stringent cold/hot temperature cycling test. In the test the optical fibers are kept at −40° C. for four hours and monitored as a function of loss in decibles per kilometer (dB/Km). The fibers are then brought back to room temperature (20°-23° C.) for two hours and thereafter held at +70° C. for four hours. Again the temperature is brought back to room temperature for two hours and the loss of the optical fiber is recorded. It has been found that the presence of up to 5%, generally 0.001 to 5.0%, preferably 0.01 to 1.0% by weight of one or more thermal stabilizers/antioxidants compatible with the cladding composition provides stability to the cold/hot cycling test. Suitable stabilizers/antioxidants include low melting hindered phenols and thioesters. Specific examples include 2,6-di-tert-butyl-4-methylphenol commercially available under the trade name Ultranox 226 TM antioxidant (Borg-Warner Chemicals, Inc., Parkersburg, N.Y.), octadecyl 3,5-di-tert-butyl-4-hydroxyhydrocinnamate commercially available under the trade names Isonox TM 132 antioxidant (Schenectady Chemicals, Inc., Schenectady, N.Y.) or Vanox TM 1320 antioxidant (Vanderbilt Co., Inc., Norwalk, Conn.) and dilauryl thiodipropionate commercially available under the trade name Cyanox TM LTDP antioxidant (American Cyanamid Co., Wayne, N.J.). A combination of thioester and hindered phenol has proven to be particularly effective.

Optical fibers of the present invention may be prepared by conventional techniques employing the cladding compositions of the invention. A low loss of optical information is desired, and it is preferred that optical losses of clad fiber of the invention be less than 10 dB/Km for siliceous cores, more preferably less than 6.0 dB/km at 820 nm.

The accompanying drawing illustrates a suitable apparatus for preparing a coated optical fiber in accordance with the invention. A glass fiber 2 is drawn from a pure silica preform 4 held in a furnace 6 on a standard glass drawing tower. The tower is provided with a coating station comprising a coating cup 8 containing the cladding composition and a metering die 10. The coated fiber is passed immediately through an ultraviolet curing station 12 where the fiber is photopolymerized and cooled on a take-up spool 14. A typical fiber will have an overall diameter of 200 micrometers and a cladding thickness of 10 micrometers.

Optical fibers of the invention may also possess a protective layer such as those known in the art. For example a protective coating of a fluoropolymer may be coated by passing the clad fiber through a melt of the fluoropolymer. A suitable fluoropolymer is Tefzel TM 210 fluoropolymer (E. I. Du Pont de Nemours & Co., Wilmington, Del.).

Polymeric claddings of the present invention are useful in optical fiber waveguides for transmitting data. Information transfer using a modulated light beam guided by the optical fibers of the invention can have applications, for example, in telecommunications and computer link-ups. Due to the increase of NA, other applications such as laser delivery systems where real time sensing capabilities are feasible with fibers cladded with compositions of the present invention. These optical fiber linkages have advantages compared to metal wires carrying electrical signals in that they have a very high information carrying capacities and are free from external interferences, such as radio frequency interference and electromagnetic interference.

Objects and advantages of this invention are further illustrated by the following examples, but the particular materials and amounts thereof recited in these examples, as well as other conditions and details, should not be construed to unduly limit the invention.

EXAMPLE 1

This Example teaches preparation of a fluorinated acrylamide silane monomer in accordance with the scheme below:

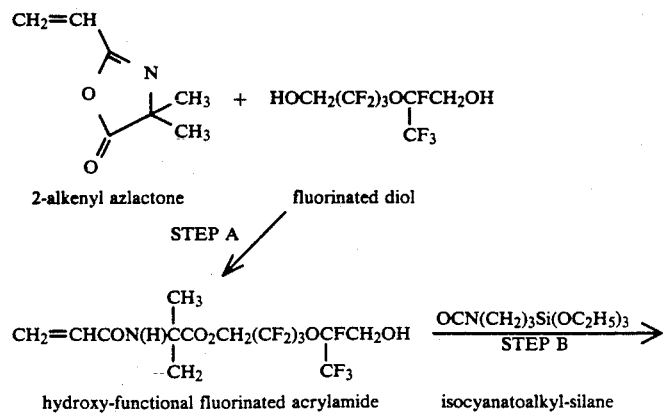

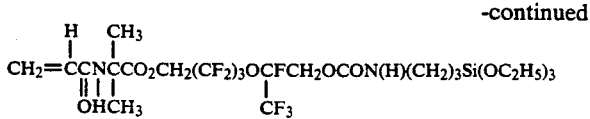

fluorinated acrylamide silane monomer

Step A: 1H,1H,7H,7H-tetrahydro-perfluoro(2-methyl-3-oxaheptane)-1,7-diol (available from Minnesota Mining & Manufacturing, St. Paul, Minn.) (41.05 grams, 0.125 mole) and 2-vinyl-4,4-dimethylazlactone (VDM) (SNPE. Inc., Princeton, N.J.) (17.41 grams, 0.125 mole) were mixed to provide a homogeneous solution. To this solution was added dry Amberlite ™ IRA-68 polymeric resin (Rohm & Haas, Philadelphia, Pa.) (3.00 grams, 5.6 meq/gram). The reaction mixture was then shaken for five hours at room temperature and thirty hours at 70° C. An infared spectrum showed characteristic absorptions for the acrylamide product. The crude product was dissolved in a solvent mixture of and Freon ™ 113 fluorinated solvent (E. I. Dupont DeNemours & Co., Wilmington, Del.) (5:1) (250 mL), and the insoluble polymeric resin was filtered. The filtrate was treated with water (30 mL) containing 5 drops of trifluoroacetic acid and stirred overnight. The above contents were poured into a separatory funnel. The organic layer was worked up in this and appropriate subsequent examples, employing the following procedure: The organic layer was separated, dried over anhydrous magnesium sulfate, and filtered. The filtrate was concentrated using a rotary evaporator to leave the desired hydroxy-functional fluorinated acrylamide.

Step B: In a one-necked 250 mL round-bottomed flask, were added the product from step A of Example 1 (24.27 grams, 0.052 mole) and 3-isocyanatopropyltriethoxysilane (Petrarch Systems, Bristol, Pa.) (12.85 grams, 0.052 mole). The mixture was stirred at room temperature under a nitrogen atmosphere and treated with 2 drops of dibutyltin dilaurate (Aldrich Chemical Co., Milwaukee, Wis.). The reaction mixture was allowed to stir an additional 16 hours at which time spectral analysis confirmed the presence of the desired fluorinated acrylamide silane monomer.

EXAMPLE 2

Preparation of Hexafluoropentamethylene Diacrylate

In a two-necked 1 L round-bottomed flask, fitted with an overhead stirrer and dropping funnel, was added acrylic acid (Aldrich Chemical Co., Milwaukee, Wis.) (46.39 grams, 0.64 mole). The flask was then immersed into a ice-water bath and over a period of 15 minutes was added trifluoroacetic anhydride (Aldrich Chemical Co., Milwaukee, Wis.) (141.62 grams, 0.67 mole). After addition was complete, the reaction mixture was stirred an additional 10 minutes at ice-water temperature. The cooled reaction mixture was then charged with hexafluoropentane diol (diol is available from Minnesota Mining & Manufacturing, St. Paul, Min.) (64.76 grams, 0.31 mole) over 15 minutes. The reaction mixture was further stirred at ice-water temperature for 30 minutes and then for 3.5 hours at room temperature. The reaction mixture was cooled to 0° C. and water (200 mL) was added over 20 minutes. The contents of the flask were poured into a separatory funnel containing Freon ™ 113 solvent (150 mL). The organic layer was worked up as described in Example 1. The residue was purified by vacuum distillation to leave pure hexafluoropentamethylene diacrylate. (This compound is disclosed in the U.S. Pat. No. 3,055,932, Example 1.)

EXAMPLE 3

Preparation of an Optical Fiber Containing a Glass Core

The following monomeric cladding composition was prepared using the fluorinated diacrylate from Example 2.

| Monomers | |
|---|---|
| (perfluorocyclohexyl)methyl acrylate (Minnesota Mining & Manufacturing, St. Paul, MN | 85.25 grams |
| trimethoxysilylpropyl methacrylate (adhesion promoter) (Union Carbide Danbury, CT) | 2.0 grams |
| fluorinated diacrylate (from Example 2) | 8.0 grams |
| Naugawhite ™ thermal stabilizer (hindered phenol) (Uniroyal Chemical Co., Inc., Naugatuck, Ct) | 0.25 grams |
| Cyanox ™ 711 thermal stabilizer (thioester) (American Cyanamid Co., Wayne, NJ | 0.5 grams |
| Darocur 1173 benzoin (UV initiator) (EM Industries, Inc., Hawthorne, NY) | 4.0 grams |

The apparatus for producing the optical fiber was a 6.7 meter (22 foot) Astro Tower equipped with an Astro Graphite Resistance Furnace (available from the Astro Division of Thermal Technologies, Santa Rosa, Calif.). The glass core material emanated from a Diasil Preform Rod (available from Mitsubishi Rayon Co., Ltd., Tokyo, Japan), and the coating station where the cladding composition was applied, was an open cup design. Ultraviolet actinic radiation was supplied by a medium pressure mercury lamp, and irradiation of the coated monomeric cladding composition took place in an atmosphere of nitrogen; the optical fiber was produced at a constant speed of 20 meters/minute.

A 200 meter length of the optical fiber consisting of a 200 micrometer glass core and a 25 micrometer clad exhibited a loss of 3.8 dB/Km. The loss measurement was obtained using a Tektronix ™ 506 Optical Time Domain Reflectometer (OTDR) (available from Tektronix, Portland, Oreg.) with the loss value at 812 nm being recorded. The principle of the OTDR measurement is discussed by D. Marcuse in his book entitled "Principles of Optical Fiber Measurements", Academic Press: New York, 1981, pp 236-241, and procedures utilized were that of Electronic Industries Association Standard 455-46 (May 1983). The numerical aperture (NA) of a 2 meter length of the optical fiber was measured to be 0.45, at 633 nm. The principle of the NA measurement is discussed by D. L. Philen and W. T. Anderson in Chapter 8 of the book entitled "Optical Fiber Telecommunications II", Academic Press: New York, 1988, pp 331-332, and test methods utilized were that of Electronic Industries Association Standard 455-47 (May 1983). Application of a Tefzel ™ 210 fluorinated polymeric buffer coating (E. I. Dupont DeNemours, Wilmington, Del.) from the melt resulted in a slight increase in optical loss to 4.9 dB/Km.

Examples 4-13 describe the preparation of cladded optical fibers according to the present invention.

EXAMPLE 4

| Monomers | |
|---|---|
| (perfluorocyclohexyl)methyl acrylate | 83.25 grams |
| trimethoxysilylpropyl methacrylate | 2.0 grams |
| fluorinated diacrylate (from Example 2) | 10.0 grams |
| Naugawhite thermal stabilizer | 0.25 grams |
| Cyanox 711 thermal stabilizer | 0.5 grams |
| Darocur 1173 benzoin UV initiator | 4.0 grams |

A 500 meter section of an optical fiber over-coated with the Tefzel 210 fluorinated polymer protective coating prepared as in Example 3 exhibited a loss of 3.9 dB/Km. Employing the procedure of Example 3 the NA measurement of this optical fiber was determined to be 0.43.

EXAMPLE 5

| Monomers | |
|---|---|
| (perfluorocyclohexyl)methyl acrylate | 91.0 grams |
| fluorinated diacrylate (from Example 2) | 5.0 grams |
| fluorinated acrylamide silane (from Example 1) | 2.0 grams |
| Darocur 1173 benzoin UV initiator | 2.0 grams |

A 600 meter section of an optical fiber over-coated with Tefzel 210 prepared as in Example 3 exhibited a loss of 4.3 dB/Km. Using the procedure of Example 3 the NA measurement of this optical fiber was found to be 0.46.

EXAMPLE 6

| Monomers | |
|---|---|
| (perfluorocyclohexyl)methyl acrylate | 86.0 grams |
| fluorinated diacrylate (from Example 2) | 10.0 grams |
| fluorinated acrylamide silane (from Example 1) | 2.0 grams |
| Darocur 1173 benzoin UV initiator | 2.0 grams |

A 1.2 kilometer section of an optical fiber over-coated with Tefzel 210 prepared as in Example 3 exhibited a loss of 3.7 dB/Km. Using the procedure of Example 3 the NA measurement of this optical fiber was found to be 0.45. The strength of the fiber was determined by proof testing the fiber at $3.45 \times 10^9$ dynes/cm$^2$ (50 kpsi) without evidence of optical loss change. The principle of proof testing optical fibers is discussed by F. C. Allard in his book entitled "Fiber Optics Handbook For Engineers and Scientists", McGraw-Hill, Inc.: New York, 1990, pp1.40-1.41 and 4.49-4.52 and test methods utilized were that of Fiber Optic Test Procedures, FOTP-31.

EXAMPLE 7

| Monomers | |
|---|---|
| (perfluorocyclohexyl)methyl acrylate | 83.0 grams |
| fluorinated diacrylate (from Example 2) | 10.0 grams |
| fluorinated acrylamide silane (from Example 1) | 5.0 grams |
| Darocur 1173 benzoin UV initiator | 2.0 grams |

A 1.2 kilometer section of an optical fiber over-coated with Tefzel 210 prepared as in Example 3 exhibited a loss of 4.2 dB/Km. Using the procedure of Example 3 the NA measurement of this optical fiber was found to be 0.44. Using the procedure of Example 6, the strength of the fiber was determined by proof testing the fiber at $3.45 \times 10^9$ dynes/cm$^2$ (50 kpsi) without evidence of optical loss change.

EXAMPLE 8

| Monomers | |
|---|---|
| (perfluorocyclohexyl)methyl acrylate | 65.0 grams |
| 1,1-dihydroperfluorooctyl acrylate (3M, St. Paul, MN) | 21.0 grams |
| fluorinated diacrylate (from Example 2) | 10.0 grams |
| trimethoxysilylpropyl methacrylate | 2.0 grams |
| Darocur 1173 benzoin UV initiator | 2.0 grams |

A 500 meter section of an optical fiber over-coated with Tefzel 210 prepared as in Example 3 exhibited a loss of 5.4 dB/Km. Using the procedure of Example 3 the NA measurement of this optical fiber was found to be 0.46.

EXAMPLE 9

| Monomers | |
|---|---|
| (perfluorocyclohexyl)methyl acrylate | 21.0 grams |
| 1,1-dihydroperfluorooctyl acrylate | 65.0 grams |
| fluorinated diacrylate (from Example 2) | 10.0 grams |
| trimethoxysilylpropyl methacrylate | 2.0 grams |
| Darocur 1173 benzoin UV initiator | 2.0 grams |

A 500 meter section of an optical fiber over-coated with Tefzel 210 prepared as in Example 3 exhibited a loss of 4.9 dB/Km. Using the procedure of Example 3 the NA measurement of this optical fiber was found to be 0.5.

EXAMPLE 10

| Monomers | |
|---|---|
| (perfluorocyclohexyl)methyl acrylate | 43.0 grams |
| 1,1-dihydroperfluorooctyl acrylate | 43.0 grams |
| fluorinated diacrylate (from Example 2) | 10.0 grams |
| trimethoxysilylpropyl methacrylate | 2.0 grams |
| Darocur 1173 benzoin UV initiator | 2.0 grams |

A 1.2 kilometer section of an optical fiber over-coated with Tefzel 210 prepared as in Example 3 exhibited a loss of 3.4 dB/Km. Using the procedure of Example 3 the NA measurement of this optical fiber was found to be 0.48. Using the procedure of Example 6, the strength of the fiber was measured by proof testing the fiber at $3.45 \times 10^9$ dynes/cm$^2$ (50 kpsi) without evidence of optical loss change.

EXAMPLE 11

| Monomers | |
|---|---|
| (perfluorocyclohexyl)methyl acrylate | 42.25 grams |

-continued

| Monomers | |
|---|---|
| 1,1-dihydroperfluorooctyl acrylate | 43.0 grams |
| fluorinated diacrylate (from Example 2) | 10.0 grams |
| trimethoxysilylpropyl methacrylate | 2.0 grams |
| Naugawhite ™ thermal stabilizer | 0.25 grams |
| Cyanox 711 ™ thermal stabilizer | 0.5 grams |
| Darocur 1173 benzoin UV initiator | 2.0 grams |

A 1.2 kilometer section of an optical fiber overcoated with Tefzel 210 prepared as in Example 3 exhibited a loss of 2.01 dB/Km. Using the procedure of Example 3 the NA measurement of this optical fiber was 0.48. Using the procedure of Example 6 the strength of the fiber was measured by proof testing the fiber at $3.45 \times 10^9$ dynes/cm$^2$ (50 kpsi) without evidence of optical loss change. The thermal stability of the fiber was determined by thermal cycling the fiber between $-40°$ C. and 70° C. The fiber was continuously cycled five times. Each temperature cycle consisted of holding the temperature constant at each extreme ($-40°$ C. and 70° C.) for four hours; between each extreme the fiber was held at 25° C. for one hour. The optical loss after the cycling test was recorded at 2.34 dB/Km.

EXAMPLE 12

| Monomers | |
|---|---|
| 1,1,2,2-tetrahydroperfluorodecyl acrylate (available from 3M, St. Paul, MN) | 87.25 grams |
| trimethoxysilylpropyl methacrylate | 5.0 grams |
| trimethylolpropanetriacrylate (available from Aldrich Chemical, Milwaukee, WI) | 5.0 grams |
| Naugawhite thermal stabilizer | 0.25 grams |
| Cyanox 711 thermal stabilizer | 0.5 grams |
| Darocur 1173 benzoin UV initiator | 2.0 grams |

A 500 meter section of an optical fiber over-coated with Tefzel 210 prepared as in Example 3 exhibited a loss of 7.0 dB/Km. Using the procedure of Example 3 the NA measurement of this optical fiber was found to be 0.48.

EXAMPLE 13

| Monomers | |
|---|---|
| (perfluorocyclohexyl)methyl acrylate | 45.25 grams |
| 1,1,2,2,-tetrahydroperfluorodecyl acrylate | 42.0 grams |
| trimethoxysilylpropyl methacrylate | 2.0 grams |
| trimethylolpropanetriacrylate | 8.0 grams |
| Naugawhite thermal stabilizer | 0.25 grams |
| Cyanox 711 thermal stabilizer | 0.5 grams |
| Darocur 1173 benzoin UV initiator | 2.0 grams |

A 1.2 kilometer section of an optical fiber over-coated with Tefzel 210 prepared as in Example 3 exhibited a loss of 2.95 dB/Km. Using the procedure of Example 3 the NA measurement of this optical fiber was found to be 0.45.

Various modifications and alterations of this invention will become apparent to those skilled in the art without departing from the scope and spirit of this invention, and it should be understood that this invention is not to be unduly limited to the illustrative embodiments set forth herein.

We claim:

1. A curable coating composition comprising at least one fluorinated mono-acrylate monomer, at least one polyethylenically unsaturated fluorinated crosslinking monomer different from the acrylate monomer, and at least one adhesion promoting monomer different from any other monomer in the composition, wherein acrylate means derivatives of acrylic acid, methacrylic acid, and other modified acrylic acids.

2. The composition according to claim 1 further comprising at least one of a silane-free fluorinated acrylamide monomer, a non-fluorinated mono- or polyethylenically unsaturated monomer, and a non-fluorinated silane monomer.

3. The composition according to claim 1 wherein said adhesion promoting monomer is a fluorinated acrylamide silane.

4. The composition according to claim 3 wherein said fluorinated acrylamide silane has the formula

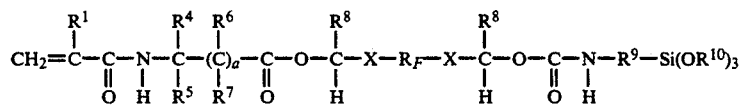

wherein:
R$^1$ and R$^8$ are independently hydrogen or methyl;
R$^4$ and R$^5$ independently can be an alkyl, cycloalkyl, or aryl group, or R$^4$ and R$^8$ taken together with the carbon to which they are joined can form a carbocyclic ring containing 4 to 12 ring atoms;
R$^6$ and R$^7$ are independently hydrogen or lower alkyl;
R$^9$ is alkylene, cycloalkylene, or arylene;
R$^{10}$ is hydrogen or lower alkyl;
a is 0 or 1;
X is a carbon-to-carbon single bond, CH$_2$, CH$_2$OCH$_2$, or CH$_2$CH$_2$OCH$_2$; and
R$_F$ is a substantially perfluorinated alkylene, cycloalkylene, or arylene group, optionally comprising up to 6 catenary non-peroxidic oxygen atoms.

5. The composition according to claim 4 wherein in said fluorinated acrylamide silane
R$^1$ is H,
R$^4$ is CH$_3$,
R$^5$ is CH$_3$,
a = 0,
R$^8$ is H,
R$_F$ = (CF$_2$)$_3$OCF(CF$_3$),
X = carbon-to-carbon single bond,
R$^9$ = (CH$_2$)$_3$,
R$^{10}$ = C$_2$H$_5$.

6. The composition according to claim 1 further comprising at least one of a photoinitiator, a thermal stabilizer and an anti-oxidant.

7. The composition according to claim 1 wherein 100 parts by weight of said composition comprises in the range of 10 to 99 parts by weight of said fluorinated monoacrylate monomer, 1 to 20 parts of said polyethylenically unsaturated fluorinated crosslinking monomer, and 0.5 to 10 parts by weight of said adhesion promoting monomer.

8. The composition according to claim 7 wherein said fluorinated monoacrylate is present in the range of 40 to 96 parts by weight.

9. The composition according to claim 7 wherein said polyethylenically unsaturated fluorinated crosslinking monomer is present in the range of 2 to 15 parts by weight.

10. The composition according to claim 7 wherein said adhesion promoting monomer is present in the range of 2 to 5 parts by weight.

11. The curable composition according to claim 2 wherein said silane-free fluorinated acrylamide monomer is present in the range of more than zero and up to 88 parts by weight.

12. The composition according to claim 7 wherein said fluorinated mono-acrylate is selected from the group consisting of compounds of the general formulae:

$$Y-C_nZ_q-(CH_2)_m-OCOCR^1=CH_2$$

and $$R^{11}SO_2NR^2(CH_2)_2-OCOCR^1=CH_2$$

wherein:
Y represents H, F, Br, Cl;
Z represents H, F, Br, Cl;
provided that Y or at least one Z is a fluorine atom;
$R^1$ represents H, or a lower alkyl group;
n is an integer from 1 to 12;
Q is an integer from 4 to 24 such that q=(2n-2) or (2n);
m is 0, 1, 2; with the proviso that for Z, not more than one atom of hydrogen or chlorine is present for every two carbon atoms in the group $C_nZ_q$;
$R^2$ is hydrogen or a lower alkyl group;
$R^{11}$ represents a fluoroaliphatic radical having 3 to 12 carbon atoms.

13. The composition according to claim 12 wherein said mono-acrylate is selected from the group consisting of
1,1dihydroperfluorocyclohexyl carbinol acrylate,
1,1dihydroperfluorocyclohexyl carbinol methacrylate,
1,1dihdroperfluoromethylcyclopentyl carbinol acrylate,
1,1dihydroperfluorocyclopentyl carbinol acrylate,
1,1didydroperfluorohexyl acrylate,
1,1dihydroperfluorobutyl acrylate,
1,1-dihydroperfluorooctyl acrylate,
1,1,2,2-tetrahydroperfluorodecyl acrylate,
1,1,2,2-tetrahydroperfluorooctyl acrylate, 1,1,2,2-tetrahydroperfluorooctyl methacrylate,1,1,2,2,-tetrahydroperfluorodecyl methacrylate, 1,1-dihydroperfluorodecyl acrylate, and
2-(N-ethyl perfluorooctanesulfonamido) ethyl acrylate, and combinations thereof.

14. The composition according to claim 13 wherein said mono-acrylate is 1,1-dihydroperfluorocyclohexyl carbinol acrylate.

15. The composition according to claim 7 wherein said polyethylenically-unsaturated fluorinated monomer is a compound having the formula:

$$CH_2=CR^1COOCH_2-C_nZ_q-CH_2OCOCR^1=CH_2$$

wherein $R^1$, n, Z, and q are as previously defined.

16. The composition according to claim 7 wherein the said polyethylenically-unsaturated fluorinated monomer is 2,2,3,3,4,4-hexafluoro-1,5-pentanediol diacrylate.

17. The curable composition according to claim 7 further comprising more than zero and up to 50 parts by weight of a non-fluorinated mono-ethylenically unsaturated monomer.

18. The curable composition according to claim 7 further comprising more than zero and up to 10 parts by weight of a non-fluorinated polyethylenically unsaturated crosslinking monomer.

19. The cured composition according to claim 1.

20. The cured composition according to claim 2.

21. An optical fiber comprising a siliceous or transparent organic polymer core and having a cladding thereon comprising the curable composition according to claim 1.

22. The optical fiber according to claim 21 wherein said cladding has been cured.

23. An optical fiber according to claim 22 having a numerical aperature of 0.40-0.50 and optical losses less than 10 dB/Km.

24. The optical fiber according to claim 22 further comprising a protective layer over said cladding.

25. A layered structure comprising a transparent substrate having coated on at least one surface thereof the curable composition according to claim 1.

26. An optical fiber waveguide comprising the optical fiber according to claim 22.

27. An optical fiber waveguide comprising the optical fiber according to claim 24.

* * * * *

UNITED STATES PATENT AND TRADEMARK OFFICE
CERTIFICATE OF CORRECTION

PATENT NO. : 5,239,026
DATED : August 24, 1993
INVENTOR(S) : Stefan A. Babirad et al.

It is certified that error appears in the above-indentified patent and that said Letters Patent is hereby corrected as shown below:

Col. 2, line 29, ""plastic clad silica (PCS)"" should read -- "plastic clad silica" (PCS) --.

Col. 7, line 47, "$(CF_2)_{30}OCF(CF_3)$;" should read -- $(CF_2)_3(OCF)(CF_3)$; --.

Col. 8, line 21, after "$R^8$ are" insert -- hydrogen; --.

Col. 8, lines 22-23, delete "$R^1$, $R^4$, $R^5$, $R^6$, $R^7$, $R^8$, a, X, and $R_F$ are as previously hydrogen;".

Col. 11, line 19, after "solvent mixture of" insert -- chloroform --.

Col. 17, line 42, "1,1dihydroperfluorocyclohexyl" should read -- 1,1-dihydroperfluorocyclohexyl --.

Col. 17, line 43, "1,1dihydroperfluorocyclohexyl" should read -- 1,1-dihydroperfluorocyclohexyl --.

Col. 17, line 45, "1,1dihdroperfluoromethylcyclopentyl" should read -- 1,1-dihydroperfluoromethylcyclopentyl --.

Col. 17, line 47, "1,1dihydroperfluorocyclopentyl" should read -- 1,1-dihydroperfluorocyclopentyl --.

Col. 17, line 48, "1,1didyroperfluorohexyl" should read -- 1,1-dihydroperfluoroethyl --.

UNITED STATES PATENT AND TRADEMARK OFFICE
CERTIFICATE OF CORRECTION

PATENT NO. : 5,239,026

DATED : August 24, 1993

INVENTOR(S) : Stefan A. Babirad et al.

It is certified that error appears in the above-indentified patent and that said Letters Patent is hereby corrected as shown below:

Col. 17, line 49, "1,1dihydroperfluorobutyl" should read -- 1,1-dihydroperfluorobutyl --.

Signed and Sealed this

Seventeenth Day of May, 1994

Attest:

BRUCE LEHMAN

Attesting Officer

Commissioner of Patents and Trademarks